UNITED STATES PATENT OFFICE.

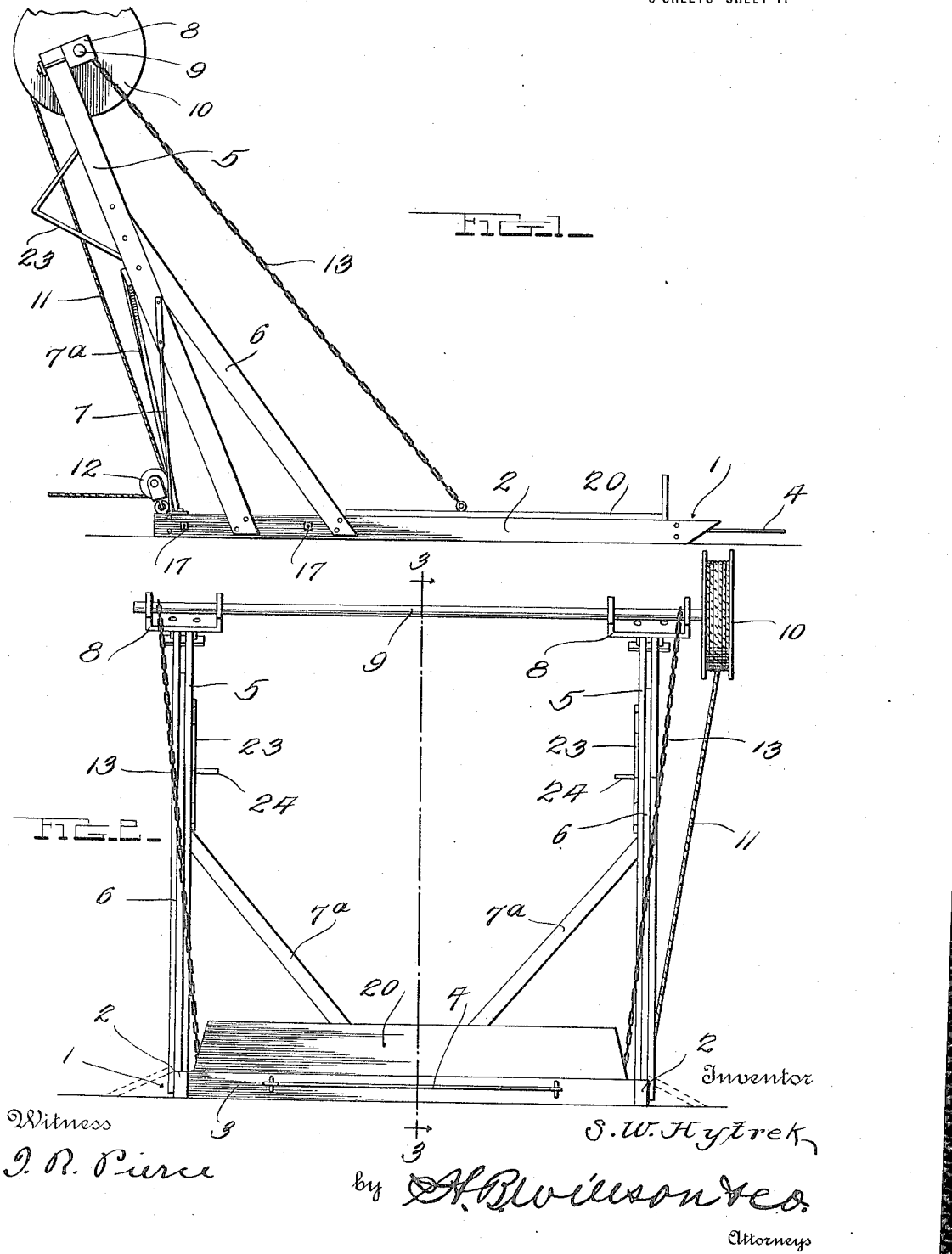

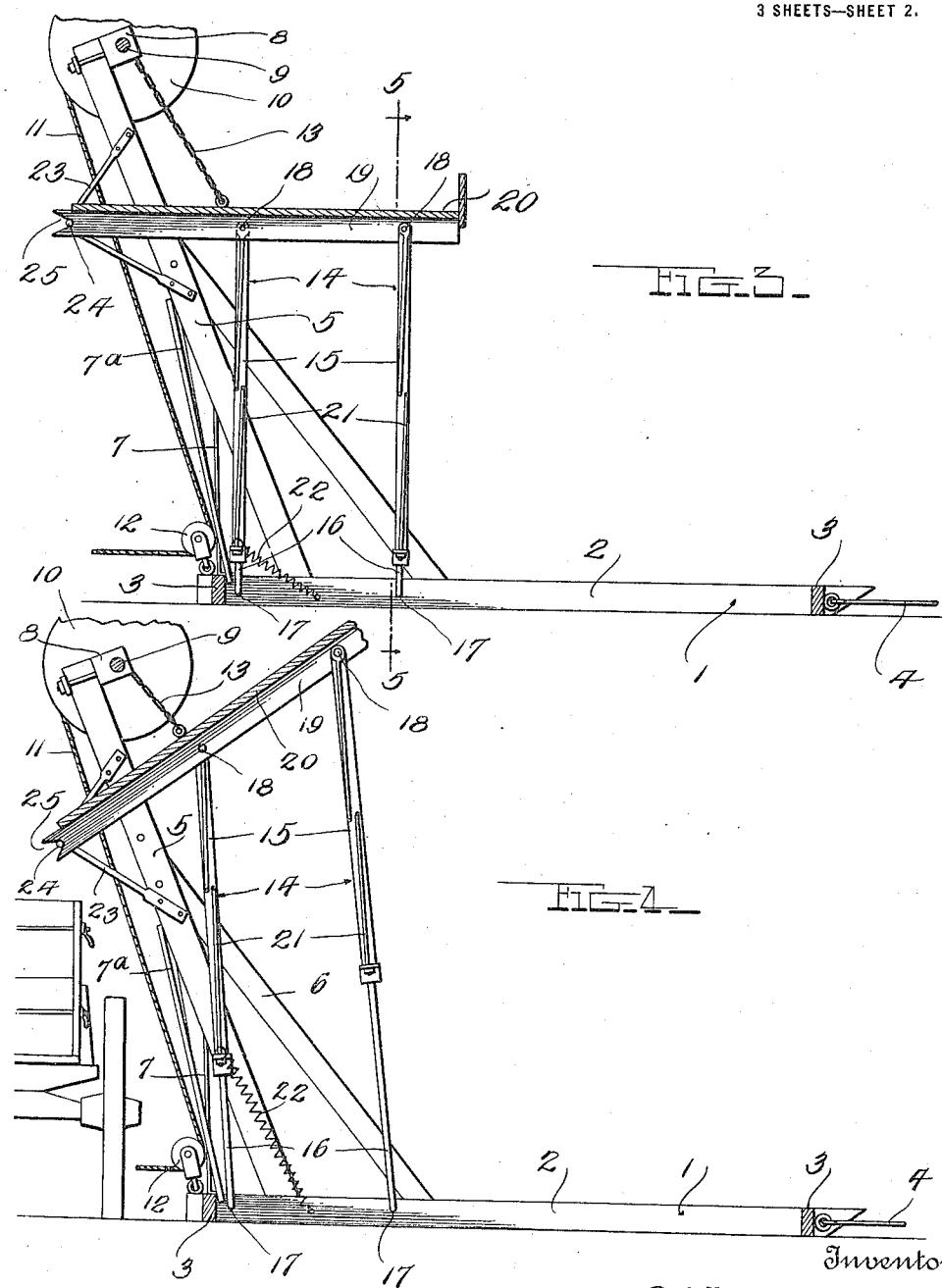

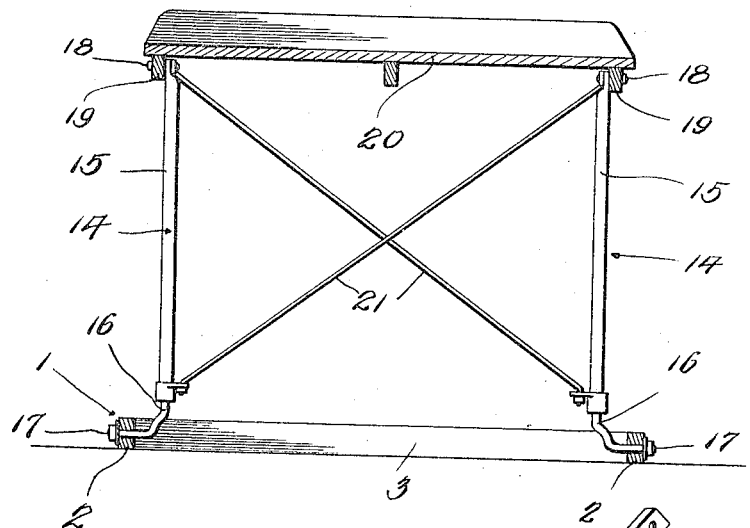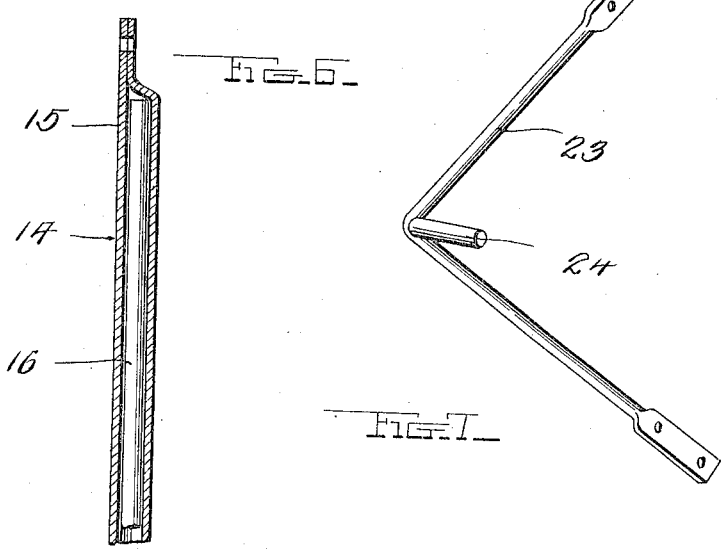

STANISLAUS W. HYTREK, OF STUART, NEBRASKA.

WAGON-LOADING DEVICE.

1,196,364.   Specification of Letters Patent.   Patented Aug. 29, 1916.

Application filed May 22, 1916. Serial No. 99,186.

*To all whom it may concern:*

Be it known that I, STANISLAUS W. HYTREK, a citizen of the United States, residing at Stuart, in the county of Holt and State of Nebraska, have invented certain new and useful Improvements in Wagon-Loading Devices; and I do declare the following to be a full, clear, and exact description of the invention, such as will enable others skilled in the art to which it appertains to make and use the same.

My invention is an improved device for loading litter or any other material from the ground into a wagon, the object being to provide a comparatively simple and inexpensive mechanism which regardless of these advantages will be highly efficient and durable.

With this general object in view, the invention resides in certain novel features of construction and in unique combinations of parts to be hereinafter fully described and claimed, the descriptive matter being supplemented by the accompanying drawings which constitute a part of this application and in which, Figure 1 is a side elevation showing the positioning of parts when depositing material onto the platform of the improved loader; Fig. 2 is a front elevation; Fig. 3 is a vertical section taken on the plane indicated by the line 3—3 of Fig. 2 showing the loading platform partially raised; Fig. 4 is a similar view with said platform completely raised; Fig. 5 is a vertical transverse section taken on the plane indicated by the line 5—5 of Fig. 3; Fig. 6, is a detail vertical section through one of the extensible supporting legs of the platform; and Fig. 7 is a perspective view of one of the stop brackets which limit the lateral movement of the platform and serve as fulcrums around which said platform tilts.

In specifically describing the construction shown in the drawings above briefly described, similar characters will be placed on corresponding parts throughout the several views and reference will be herein made to the numerous elements by their respective indices. To this end, the numeral 1 designates a suitable base which preferably comprises a pair of skids 2 and transverse bars 3 connecting them, any suitable bracing means being provided. A bail or the like 4 is connected to and extends forwardly from the front transverse bar 3, whereby one or more horses may be hitched to the device to pull the same from place to place.

A pair of standards 5 are secured to and incline upwardly and rearwardly from the rear ends of the skids 2, said standards being held rigidly by inclined brace bars 6 secured thereto at their upper ends and to the aforesaid skids at their lower ends. Lateral shifting of the standards 5 is prevented by brace rods 7 and other braces 7ª as shown most clearly in Figs. 1 and 2. The upper ends of the standards 5 carry horizontally alined bearings 8 in which a winding shaft 9 is rotatably mounted, one end of said shaft having thereon a drum 10 upon which a cable 11 is wound, said cable depending from said drum through a sheave 12 and extending from said sheave any suitable distance to allow a horse or other power to be connected therewith. For purposes to be described, a pair of chains 13 are connected at one end with the shaft 9 whereupon said chains will be wound when said shaft is rotated by a pull on the free end of the cable 11.

Two pairs of extensible and contractible legs 14 are pivoted at their lower ends to the skids 2, said legs preferably comprising upper sections 15 in the form of pipes and lower sections 6 in the form of rods 16 sliding in said pipes, the lower ends of said rods being pivoted at 17 to the aforesaid skids, while at 18 the upper ends of the pipes 15 are pivoted to bars 19 which extend beneath a horizontal platform 20. Downward movement of the sections 15 on the rods 16 may be prevented in any suitable manner but said rods preferably abut the closed upper ends of the pipes 15 (see Fig. 6). Crossed brace rods 21 extend between the upper and lower ends of the pipes 15 and are shown as secured at their lower ends to collars on the lower ends of said pipes, and a coiled spring 22 is secured at one end to one of these collars and at its other end to one of the skids 2. The chains 13 are secured at their free ends to the platform 20 between the front and rear edges of the latter, said chains serving to move said platform from its normally lowered position (see Fig. 1) to the partially raised position shown in Fig. 3 and to tilt said platform from the last named position. All of this takes place when the chains 13 are wound upon the shafts 9, the legs 14 swinging around their pivots until the platform reaches the location shown in Fig. 3 and then increasing in length as said platform is tilted.

A pair of V-shaped brackets 23 are secured one to each of the standards 5, the pointed ends of said brackets having formed thereon inwardly projecting stop pins 24 adapted for reception in V-shaped notches or keepers 25 at the rear edge of the platform 20, being preferably formed in the rear ends of the bars 19. The pins 24 serve to limit the rearward movement of the platform 20 and further serve as fulcrums around which said platform may tilt when a further pull is exerted on the cable 11.

In operation the platform 20 will be loaded in its lowered position and the wagon will be positioned in rear of the standards 5, whereupon a pull will be exerted on the cable 11. The result of this is that the shaft 9 is rotated to wind the chains 13 thereon, thus first moving the platform 20 until it strikes pins 24 and then tilting said platform around said pins to discharge its load into the wagon bed. During this operation the spring 22 is placed under tension and therefore acts to initially start the moving parts of the device on their return paths.

From the foregoing description, taken in connection with the accompanying drawings, the construction and manner of operation of the improved loader will be readily understood and it will be observed that it is unnecessary to lift the material from the ground by hand, such material being preferably deposited on the platform 20 by means of a scoop or the like which constitutes no part of the present invention.

In conclusion I will state that although certain specific details of construction have been shown and described for accomplishing probably the best results, numerous changes may be made within the scope of the invention as claimed without sacrificing the main advantages thereof.

I claim:—

1. A loader comprising a base, a normally lowered loading platform, parallel legs pivoted at one end to the base and at their other ends to said platform, said legs being normally swung forwardly and being extensible, means for moving said platform upwardly and rearwardly, the parallel legs serving to retain said platform in a horizontal position during this operation, and means for limiting the rearward movement of said platform, said last named means serving as a fulcrum around which said platform may tilt to discharge its load, this tilting being permitted by the extensibility of the legs.

2. A loader comprising a base, a normally lowered loading platform, parallel legs pivoted at one end to the base and at their other ends to said platform said legs being normally swung forwardly and being extensible, means for moving said platform upwardly and rearwardly, the parallel legs serving to retain said platform in a horizontal position during this operation, a pair of standards rising from the base, and coacting stop means on said standards and platform for limiting the rearward movement of the latter, said stop means serving as a fulcrum around which said platform may be tilted to discharge its load.

3. A loader comprising a base, a normally lowered loading platform, parallel legs pivoted at one end to said base and at their other ends to said platform, said legs being normally swung forwardly and being extensible, a pair of fixed standards rising from the rear end of the base, a winding shaft rotatably mounted on the upper ends of said standards, cable members secured at one end to said winding shaft and at their other ends to the platform between the front and rear edges of the latter, means for rotating said winding shaft whereby to move the platform upwardly and rearwardly, the legs serving to maintain said platform in a horizontal position during this operation, and coacting stop means on the standards and platform for limiting the rearward movement of the latter and holding the rear edge thereof against upward movement, whereby further winding of the cable members will tilt said platform to discharge its load.

In testimony whereof I have hereunto set my hand in presence of two subscribing witnesses.

STANISLAUS W. HYTREK.

Witnesses:
C. W. GLADHILL,
LEO J. HENNEY.

Copies of this patent may be obtained for five cents each, by addressing the "Commissioner of Patents, Washington, D. C."